Feb. 6, 1962     E. A. HENRY     3,019,636
ULTRASONIC INSPECTION AND MEASURING MEANS
Filed Oct. 30, 1958

United States Patent Office 3,019,636
Patented Feb. 6, 1962

3,019,636
ULTRASONIC INSPECTION AND MEASURING MEANS
Elliott A. Henry, Newtown, Conn., assignor to Sperry Products, Inc., a corporation of New York
Filed Oct. 30, 1958, Ser. No. 770,779
4 Claims. (Cl. 73—67.7)

This invention relates to the non-destructive inspection of materials, and the measurement of the thickness of such materials by the transmission of ultrasonic wave energy through one face thereof. More particularly, the invention relates to improvements in devices and systems such as are disclosed in the U.S. patent to Rassweiler and Erwin, No. 2,431,234, granted November 18, 1947.

The subject matter of the patent just mentioned is the measurement of the thickness of a workpiece in terms of its resonant frequency in the thickness mode. The underlying theory of that invention is based upon the fundamental relation between frequency, velocity and wavelength, wherein the frequency of vibrations in the material is equal to the velocity of propagation divided by the wavelength. For fundamental resonance in the thickness mode, the thickness is equal to one-half the wavelength, and, as the velocity is constant for a given material, the thickness of a workpiece will be equal to a constant (which is one-half the velocity in the material) divided by the resonant frequency, which is the frequency at which maximum vibration amplitude will be obtained in the workpiece.

For the purpose of discovering this resonance frequency which corresponds to the workpiece thickness, a range of frequencies of ultrasonic energy was applied to the workpiece, and the resonant point was indicated upon an oscilloscope whose sweep corresponded to the length of time which it took the apparatus to operate once through its frequency range. In the apparatus of the Rassweiler patent, the resonant points for establishing workpiece thickness were taken as the frequency values for which maximum electrical load was imposed on the variable frequency generator which excited the transducer or crystal, which was acoustically coupled to the test specimen or workpiece.

The difficulty in the foregoing is that the frequency of maximum load on the generator corresponds to the frequency of maximum power transfer of acoustic (ultrasonic) energy into the workpiece, and it was assumed that this condition corresponded to the frequency of maximum vibration amplitude in the workpiece. However, as I have shown in my patent No. 2,680,372, granted June 8, 1954 to the assignee of the present invention, this assumption is not valid, and in fact the true resonant frequency (maximum vibration amplitude in the workpiece) was not measured or indicated by such apparatus. These prior devices attained their unquestionably useful results only through the use of comparison or standardization techniques, accomplished by calibrating the instrument against test specimens of known thickness. In addition, the power sensitivity characteristic of these devices made the indication, for a test specimen of given thickness, dependent upon the degree of acoustic coupling which existed between the transducer and the workpiece. This made reproducible measurements difficult to obtain.

The reason for the foregoing differences between the frequency of maximum vibration amplitude in the workpiece, and the frequency of maximum power transfer into the test specimen, is that a crystal transducer of the piezoelectric type exhibits a capacitive reactance when it is driven at a frequency lower than its natural frequency, and the magnitude of this reactance increases as the driving frequency departs from the natural frequency. Inasmuch as power can only be delivered to a resistive load, including the resistive component of a load which is a complex impedance, maximum power will actually be transferred only when the load exhibits a reactive component equal in magnitude, and opposite in sign, to that of the generator. Where the generator (including in this broad term the transducer) has a capacitive component of reactance, the load impedance must have an inductive reactance component, and therefore maximum power transfer will always occur at a frequency somewhat higher than the true resonant frequency, at which the amplitude of vibration would be a maximum.

The magnitude of the error due to the foregoing depends upon the particular material being inspected, being of the order of ten percent for steel and forty-six percent for aluminum test specimens, over a range of one octave and where natural quartz is employed as the transducing means.

It is accordingly a principal object of the present invention to provide a method and means for the accurate measurement or gaging of the thickness of a part or workpiece, especially where only one surface thereof is accessible.

A further object of the invention is to provide a scanning and viewing arrangement for ultrasonic thickness measuring and gaging operations, utilizing an ultrasonic acoustic transducing means which is directly responsive to the amplitude of vibrations in the test specimen, and thereby avoiding the errors introduced in prior measurements of this general character.

In general, I accomplish the objects of the invention by avoiding the erroneous assumption dealt with above, and utilizing a special form of transducer in combination with a suitable circuit, so that a direct indication of the amplitude of vibrations in the workpiece is obtained, to indicate the fact of resonance without relying on the indication of maximum loading of the generator driving the transducer.

Further objects and advantages of the invention will be apparent from the following detailed specification of a preferred form of the invention, taken in connection with the appended drawings, in which.

Figure 1:
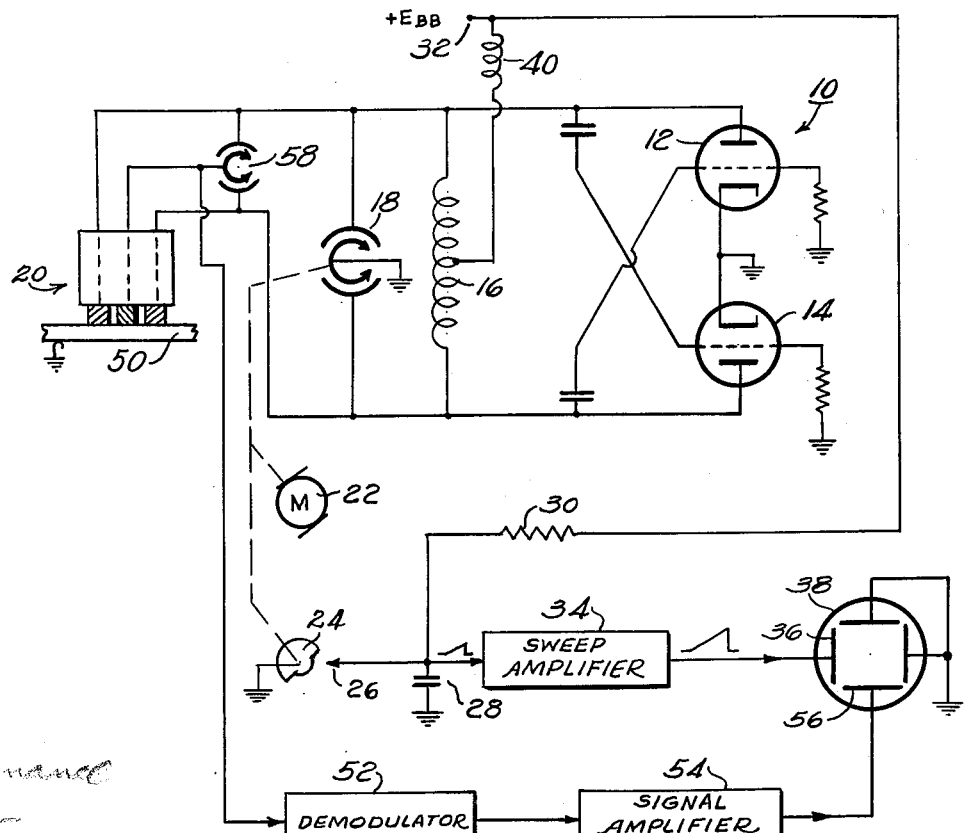
FIGURE 1 is a schematic diagram, partly in block form, of a complete apparatus in accordance with the invention.
Figure 2:
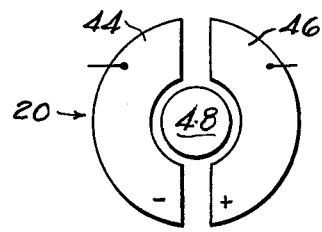
FIGURE 2 is a plan view of a preferred form of crystal arrangement for the transducer shown in FIGURE 1.
Figure 3:
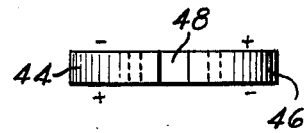
FIGURE 3 is a side elevational view of the same crystal arrangement.

Referring first to FIGURE 1 of the drawings, I have illustrated a preferred and exemplary form of the apparatus, including a high-frequency generator 10 comprising the two interconnected tubes 12 and 14 and the push-pull tank circuit comprising center-tapped inductor 16 and capacitor 18, and associated components, all coupled to the transducer generally designated 20. Cyclical variation of the frequency of the generator 10 is thus obtained by continuously rotating the rotor element of the capacitor 18, as by a motor 22 which also drives a cam 24 forming one contact element of a periodic switch whose other contact is indicated at 26. The periodic switch 24—26 thus acts periodically to short-circuit a storage capacitor 28, for one-half of each complete rotation of the rotor of capacitor 18. Whenever the cam switch is open, which occurs for half of each revolution of the rotor of capacitor 18, the capacitor 28 will be more or less gradually charged up through resistor 30 from the positive high voltage source 32, which may also furnish the D.C. plate supply current for generator 10 and other components.

Resistor 30 and capacitor 28 are so chosen that, during the period when switch 24—26 is closed, the exponential rise in voltage across the terminals of capacitor 28 is not more than about five percent of the available source voltage at 32. Thus, an essentially linear sawtooth wave of voltage will appear across capacitor 28, relative to ground or the common reference voltage level. The sawtooth voltage wave is amplified as by sweep amplifier 34 and applied to one of the horizontal deflecting plates 36 of the oscilloscope 38, the opposite plate being grounded. The horizontal sweep deflection, and rapid retrace, of the oscilloscope, will thus be synchronized with the frequency excursion of the high frequency generator 10 produced by rotation of the rotor of capacitor 18.

The form of push-pull oscillator 10 indicated is well known to those skilled in electronics. The oscillation frequency is determined by the values of inductance 16 and capacitor 18. The latter is of the split-stator type whose rotor is grounded, while the inductor has its center tap connected to the D.C. anode supply 32 through a radio frequency choke coil 40, serving to maintain the inductor center tap above the alternating current ground level, so that the neutral voltage point of the system is at the rotor of capacitor 18. With this arrangement, the amplitude of the high frequency voltages between the anode of tube 12 and ground, and between the anode of tube 14 and ground, will always be equal in magnitude and opposite in phase, thus enhancing the isolation of the signal transmitting and detecting means to be described below.

The two equal but out-of-phase outputs from generator 10 are applied to the two transmitting piezoelectric elements 44 and 46 of the transducer assembly 20, which is constructed in accordance with the teaching of my copending application, Serial No. 751,682, filed July 29, 1958, and owned by the assignee of this invention. Briefly, the arrangement of the transducer includes the two symmetrically positioned transmitter crystals 44 and 46 which are identical with one another but are assembled with opposite polarity, as indicated by the plus and minus signs on the drawing. The detecting or receiving crystal 48 is mounted on the same plane as, and concentric with, the transmitting crystals, and may thus have a circular shape in plan, so as to maintain the symmetry of the assembly.

The theory of operation of the crystal transducer as described is that, while it operates in the known way to convert applied electrical pulses into transmitted waves, and vice versa, the electrical waves operating the transmitting crystals will be excluded from having any effect on the detecting crystal 48. That is, the crystals 44 and 46 having opposite polarity, and being driven by respective electrical waves which are in phase opposition, will still produce acoustic waves or pulses which are in phase and additive in the test specimen 50, thus behaving as a single crystal. However, those electrostatically coupled effects which are produced in detector crystal 48, by such electrical waves, will be equal in magnitude and opposite in phase, and will cancel one another.

Thus, referring again to FIGURE 1, the transducer 20 is coupled to the test specimen 50 as by a suitable acoustic couplant such as oil, and when the driving frequency is equal to a fundamental or harmonic resonant frequency of the test specimen, the reverberations in the specimen will be of maximum amplitude, this condition corresponding to true resonance in the specimen and thus to the actual thickness of the same. The detecting or receiving crystal 48 is pressure or amplitude sensitive, in that the voltage it generates is directly proportional to its face displacement, and therefore the maximum voltage will be generated by the detecting crystal 48 when the amplitude of vibration in the test specimen 50 is a maximum.

The voltage output of detecting crystal 48 is connected to a demodulator 52, wherein the high frequency wave is converted into a unidirectional pulse or train of pulses, and amplified by the signal amplifier 54. The amplified output from amplifier 54 is coupled to one vertical deflecting plate 56 of the oscilloscope 38, the opposite plate again being grounded.

In order to permit substantially perfect balancing between the crystals 44 and 46, taking into account their associated wiring to the generator 10, and other unavoidable sources of electrical assymmetry, and also to ensure balancing as between crystals 44, 46 and crystal 48, a balancing capacitor 58 is provided, the same also being of the split stator type with its rotor connected to the lead from crystal 48, and its stator halves connected to the leads of crystals 44 and 46. By adjusting capacitor 58, nice equalization of the electrical capacitances, including stray capacitances, may be compensated, ensuring complete cancellation, from the output of crystal 48, of any wave energy coupled thereinto from the crystals 44, 46 or their associated wiring.

It will be seen from the foregoing that I have devised a combination of apparatus by which the existence of maximum amplitude acoustic vibrations within a workpiece can be sensed directly, in terms of the exciting frequency producing that maximum, to signify workpiece thickness directly, rather than in terms of the electrical load reflected into the high frequency generator. While the description has been concerned with measurement of thickness only, it is clear that the same or equivalent apparatus can also be used to determine the depth from one surface of a sufficiently reflective discontinuity other than merely the opposite face of the specimen. Various modifications can be made in the system and apparatus as disclosed, without departing from the spirit of the invention as defined by the appended claims.

What is claimed is:

1. Apparatus for ultrasonic inspection of a workpiece, including a transducer having a single receiving element and a pair of spaced transmitting elements disposed symmetrically with respect to said receiving element, said elements being disposed in proximity to one another and having one surface thereof defining a common plane, each of said elements being constructed of a piezo-electric material, a wave signal generator having a balanced output circuit including a pair of complementary sections, each coupled to one of said transmitting elements, and means for deriving from said receiving element a potential indicative of the amplitude of acoustic waves produced in the workpiece.

2. Apparatus in accordance with claim 1, including means for cyclically varying the frequency of said wave signal generator over a range encompassing the resonant frequency of acoustic waves in said workpiece.

3. Apparatus in accordance with claim 1, in which the transmitting elements are assembled in reversed-polarity sense with reference to the directional axis thereof.

4. Apparatus in accordance with claim 1 in which said output circuit is comprised of an inductor having a pair of end terminals and a center tap, each of said end terminals and said center tap defining a respective one of said complementary sections.

References Cited in the file of this patent

UNITED STATES PATENTS

| | | |
|---|---|---|
| 2,284,545 | Usselman | May 26, 1942 |
| 2,373,351 | Sims | Apr. 10, 1945 |
| 2,514,482 | Farmer | July 11, 1950 |
| 2,625,035 | Firestone | Jan. 13, 1953 |
| 2,784,325 | Halliday et al. | Mar. 5, 1957 |
| 2,800,789 | Henry | July 30, 1957 |